United States Patent [19]

Morita

[11] Patent Number: 5,109,982
[45] Date of Patent: May 5, 1992

[54] CASSETTE CONTAINER CASE WITH RECESSED WALLS

[75] Inventor: Kiyoo Morita, Kanagawa, Japan

[73] Assignee: Fuji Photo Film Co., Ltd., Kanagawa, Japan

[21] Appl. No.: 556,152

[22] Filed: Jul. 23, 1990

[51] Int. Cl.⁵ .......................................... B65D 85/672
[52] U.S. Cl. ................................... 206/387; 206/232; 206/312
[58] Field of Search ............... 206/387, 232, 312, 313, 206/444

[56] References Cited

U.S. PATENT DOCUMENTS

| | | | |
|---|---|---|---|
| D. 224,177 | 7/1972 | Wallace | 206/387 |
| 4,235,334 | 11/1980 | Ahn | 206/387 |
| 4,445,612 | 5/1984 | Shephard | 206/387 |
| 4,527,690 | 7/1985 | Schmidts et al. | 206/387 |

FOREIGN PATENT DOCUMENTS 2106807  7/1973  Fed. Rep. of Germany ...... 206/387

*Primary Examiner*—Paul T. Sewell
*Assistant Examiner*—Thomas P. Hilliard
*Attorney, Agent, or Firm*—Sughrue, Mion, Zinn, Macpeak & Seas

[57] ABSTRACT

A cassette container case which can be formed with a thickness much smaller than that of a conventional case. The cassette container case includes a lid in which is formed a pocket for receiving the front open portion of a cassette and a casing having rotation-preventing projections and which is pivotally connected to the lid for movement between open and closed positions. Recessed portions for receiving the thick portion of the cassette at the front open portion of the cassette are formed in the inner surface of the pocket. The recessed portions have a width in the direction of insertion of the cassette so as to enable the insertion and removal of the cassette.

2 Claims, 3 Drawing Sheets

CASSETTE CONTAINER CASE WITH RECESSED WALLS

BACKGROUND OF THE INVENTION

The present invention relates generally to a cassette container case for storing a magnetic tape cassette, and more particularly to an improved cassette container case for storing a magnetic tape cassette for audio use or the like.

When storing an audio type magnetic tape cassette, the cassette is generally placed in a magnetic tape cassette container case made of a plastic material. The magnetic tape cassette has a front open portion into which a magnetic head, etc., is inserted when loading the cassette into a recording/reproducing device, the magnetic tape running across the front open portion during recording and reproduction. However, without some way of enclosing the cassette, dust is liable to enter the cassette through the front open portion, and there is a risk that the user's fingers, etc., may contact the magnetic tape. In order to prevent such difficulties and to protect the whole of the cassette, a cassette container case is commonly used.

FIG. 5 shows the basic construction of a conventional cassette container case. The cassette container case 31 has a lid 32 having a pocket portion 34 for receiving a cassette 20, and a casing 35 having a pair of rotation-preventing projections 7 which are adapted to be inserted into respective shaft insertion holes 22 of the cassette 20.

In the cassette container case 31, pivot pins formed on right and left side walls of the casing 35 are fitted in corresponding through-holes formed in the right and left side walls of the pocket portion 34. With this arrangement, the lid 32 and the casing 35 can be opened and closed much like a door. The thickness of the cassette container case 31 between its walls 33 and 36 opposed respectively to the front and rear faces of the cassette 20 corresponds to the thickness of the thick portion 21 of a cassette 20 in the region of its front opening. Therefore, except for the thick portion 21, the thickness $l_1$ of the cassette container case 31 is considerably greater than the thickness $l_2$ of the cassette 20.

Thus, when the cassette 20 is placed in the cassette container case 31 for storage purposes, a considerably greater storage space is required than if the cassette 20 were stored without a case. For this reason, if the user wishes to store as many cassettes 20 as possible in a limited space, for example, in an automobile, the user often refrains from using cassette container cases 31. However, if the cassette 20 is stored without the use of a cassette container case 31, dust tends to enter the cassette as described above, which results in a problem in that the recording and reproducing characteristics of the magnetic tape are degraded. Also, there is another problem in that the cassette when dropped directly receives an impact and therefore can be damaged.

In order to overcome the above problems, the applicant of the present invention has earlier proposed thin-type cassette container cases. (See U.S. Pat. Nos. 4,648,507 and 4,627,534).

In such a thin-type cassette container case, the cassette is inserted into the case in a direction opposite that in the earlier cassette container cases in such a manner that the thick portion of the cassette is disposed at the open side of the cassette container case. Recesses for receiving the thick portion are formed respectively in the upper and lower walls of the cassette container case.

The improved cassette container case disclosed in U.S. Pat. No. 4,627,534 will now be more specifically described with reference to FIG. 4. The cassette container case 11 shown in FIG. 4 has a lid 12 having a pocket portion 14, and a casing 15 which is pivotally connected to the lid 12 as in the conventional cassette container case. A recess 18 for receiving the thick portion 21 of a cassette 20 is formed in a wall 13 of the lid 12 opposed to the face of the cassette. Another recess 18 for receiving the thick portion 21 of the cassette is also formed in a wall 16 of the casing 15 opposed to the face of the cassette. A pair of rotation-preventing projections 7, similar to those of the conventional cassette case, which are insertable into reel shaft insertion holes 22 are also formed on the wall 16.

The two recesses 18 are provided in the inner surfaces of the case in opposed relation to each other. Each recess 18 is shaped to receive the thick portion 21, that is, each recess has a shape (for example, a trapezoidal shape) flaring outward away from the axis of rotation (opening and closing movement) of the lid 12 and the casing 15.

Although not shown in the drawings, protrusions are formed on right and left side walls 19 of the casing 15, and respective depressions are formed in right and left side walls of the pocket portion 14 opposed to the walls 19. The protrusions are engageable in the depressions when the lid of the cassette container case 11 is closed, thereby preventing the lid from being accidentally opened during the storage of the cassette.

When the lid of the cassette container case 11 is in the closed position, the spacing between the wall 13 and the wall 16 is only slightly greater than the thickness $l_2$ of the cassette 20 in areas other than the thick portion 21, and the spacing between the two recesses 18 is only slightly greater than the thickness of the thick portion 21. Therefore, the improved cassette container case 11 shown in FIG. 4 has a much smaller thickness than the earlier cassette container case, the space required for storing it is much reduced, and the improved case is very handy for carrying.

However, in the above thin-type cassette container case 11, a magnetic head insertion opening 23 of the cassette 20 is positioned at the open side of the case 11. For this reason, when the lid 12 is to be opened, the users fingers are liable contact the magnetic tape 24 exposed at the magnetic head insertion hole 23. Finger contact with the magnetic tape 24 tends to cause problems such as drop-out of recorded signals due to deposition of dust and stretching and other damage to the tape. This is clearly not desirable from the viewpoints of recording and reproduction.

Further, since the recessed portions 18 and 18 are thin, those portions of the lid 12 and casing 15 near the recessed portions 18 and 18 have less mechanical strength than other portions. Therefore, there has been a problem that when a load is exerted on the edge portions adjacent the recessed portion 18, breakage due to flexing, cracking or the like is liable to develop.

SUMMARY OF THE INVENTION

Accordingly an object of the present invention is to overcome the above deficiencies and provide a thin-type cassette container case in which the user's fingers are prevented from contacting the magnetic tape when the lid is opened, and wherein flexing, cracking and the like are prevented from developing in the vicinity of the recessed portions.

The above and other objects have been achieved by a cassette container case wherein a lid having a pocket for receiving a front open portion of a cassette and a casing having rotation-preventing projections are pivotally connected for movement between open and closed positions, and recessed portions for receiving the thick portion of a cassette at the front open portion of the cassette are formed in an inner surface of the pocket, the recessed portions having a width in the direction of insertion of the cassette so as to enable the insertion and removal of the cassette.

DESCRIPTION OF THE PREFERRED EMBODIMENTS

Preferred embodiments of a cassette container case of the present invention will now be described in detail with reference to the drawings.

Figure 1:
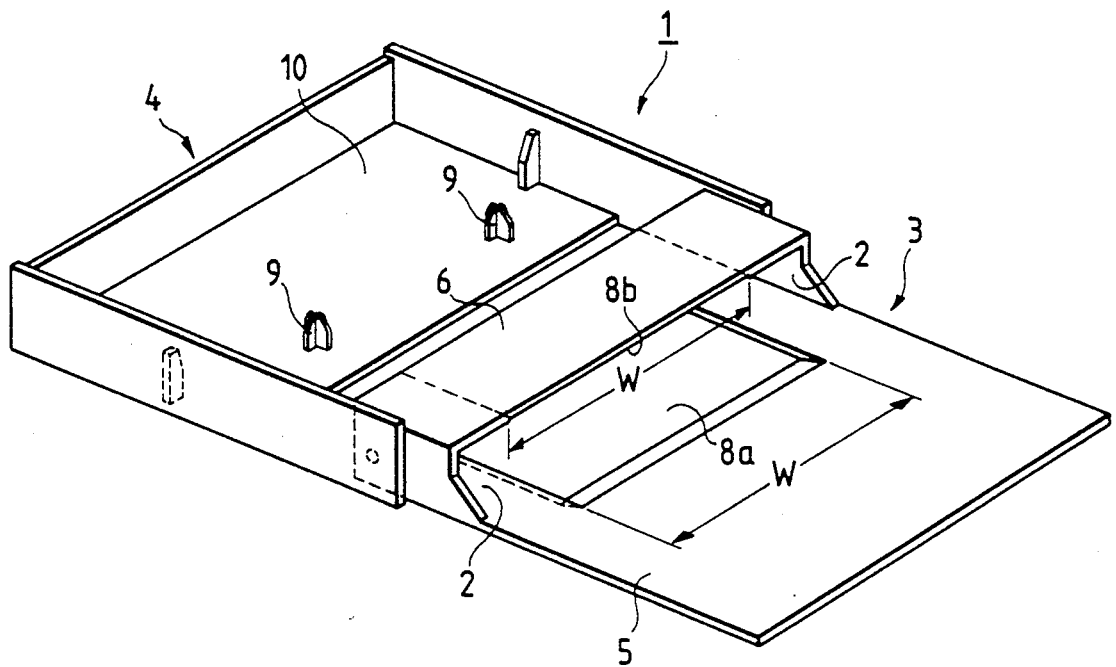
FIG. 1 is a perspective view of a cassette container case constructed in accordance with the present invention.
Figure 2:
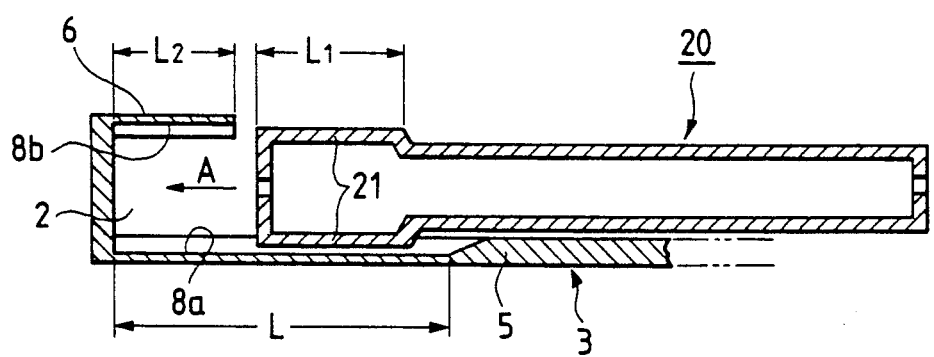
FIGS. 2 and 3 are cross-sectional views of important portions of the cassette container case of FIG. 1 showing the insertion of a cassette into a pocket.
Figure 3:
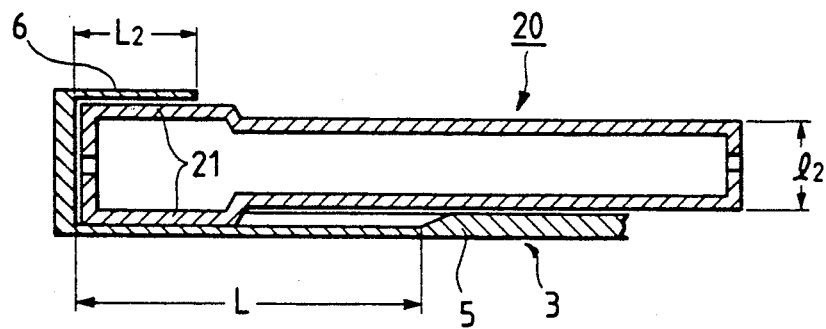
Figure 4:
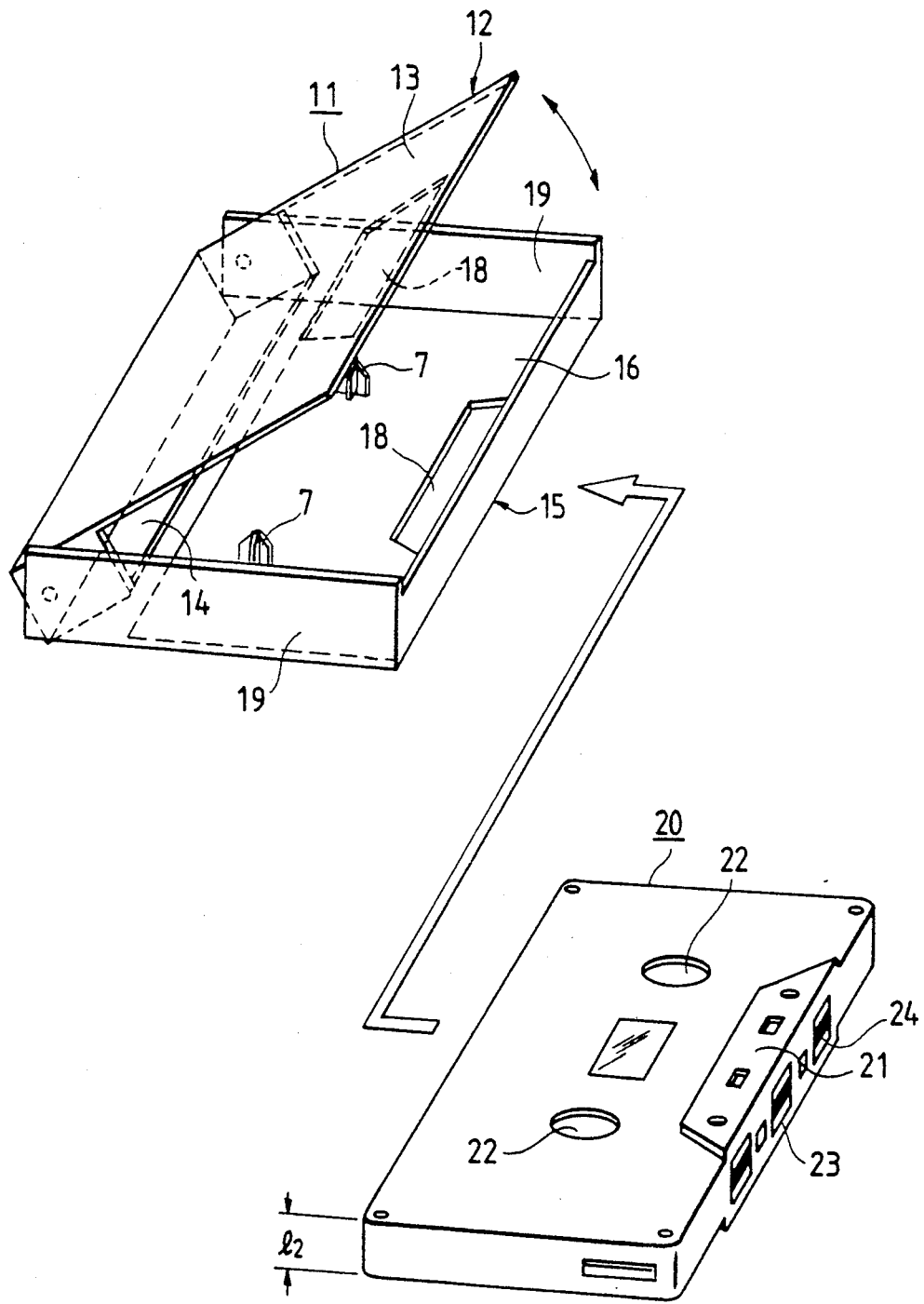
FIGS. 4 and 5 are perspective views showing conventional cassette container cases.
Figure 5:
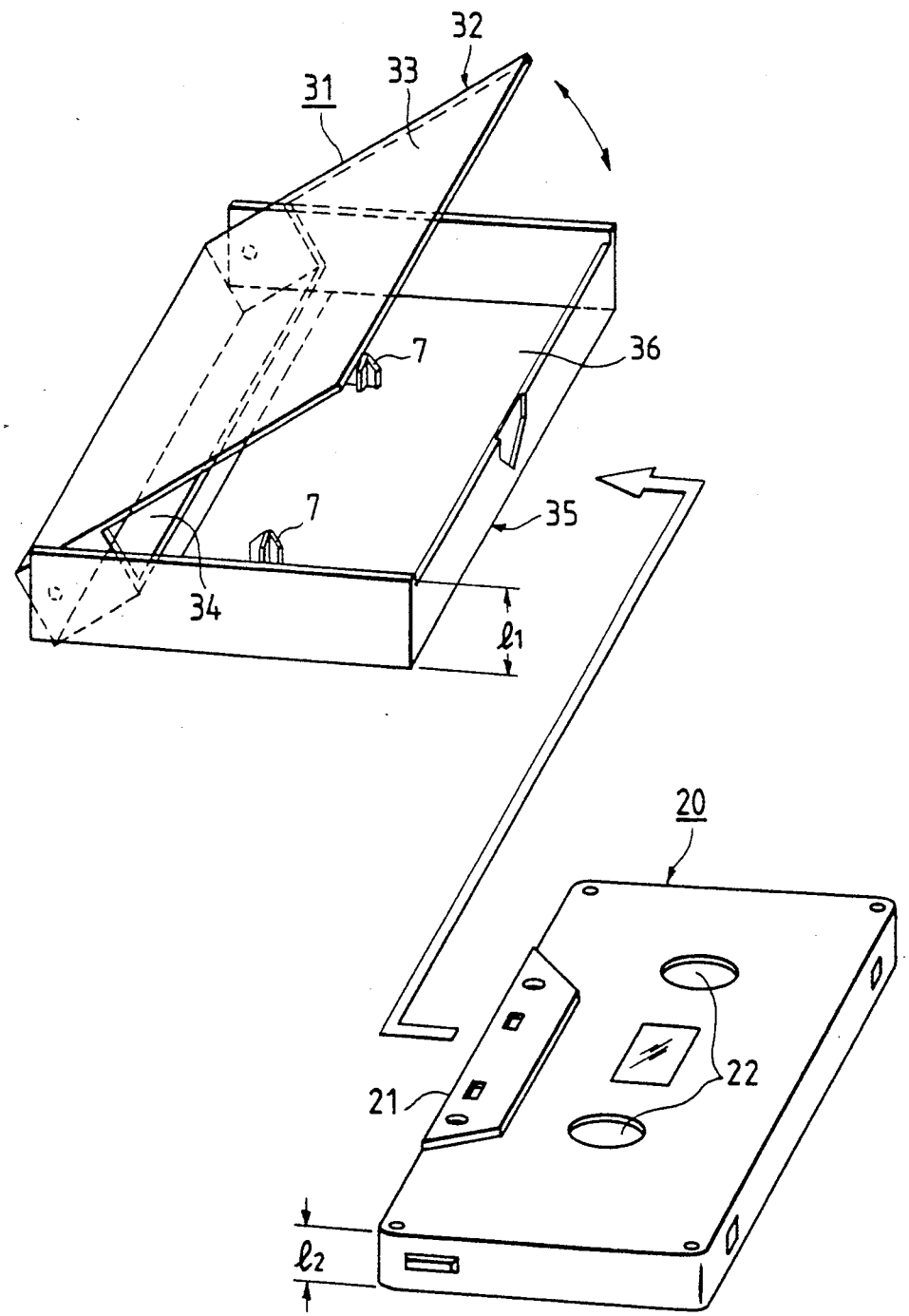

FIG. 1 is a perspective view of a cassette case container according to the present invention, and FIGS. 2 and 3 are cross-sectional views of important portions of this cassette container case illustrating the insertion of a cassette into a pocket of the case.

The cassette container case 1 has a lid 3 having a pocket 2, and a casing 4 pivotally connected to the lid 3, the latter having a pair of rotation-preventing projections 9. Recessed portions 8a and 8b for receiving the thick portion of a cassette 21 of the front open of a cassette 20 are formed respectively in the inner surfaces of the upper and lower walls of the pocket 2 for receiving the front open portion of the cassette 20.

The recessed portion 8a is formed in a wall 5 of the lid 3 opposed to the face of the cassette, and is disposed at the pocket side. The recessed portion 8b is formed in the inner surface of a pocket portion 6 disposed in opposed relation to the recessed portion 8a.

The width W of the recessed portions 8a and 8b in the direction of width of the case from the right to left is slightly greater than the width of the thick portion 21 of the cassette extending in the direction of width of the cassette from right to left.

The recessed portion 8b extends over the entire area of the pocket portion 6 in the front-to-rear direction of the case. The height L of the recessed portion 8a in the direction from the rear of the pocket toward the front of the case is slightly greater than the sum of the dimension $L_1$ of the thick portion 21 in the direction from the front to rear of the cassette and the height $L_2$ of the pocket portion 6. (See FIGS. and 3). The edge of the recessed portion 8a directed toward the open side of the case is suitably tapered or curved so as to facilitate insertion and removal of the cassette 20.

When the cassette 20 is to be placed in the cassette container case 1, one side of the thick portion 21 is first received in the recessed portion 8a, and then the cassette 20 is slidingly moved into the pocket, as indicated by an arrow A in FIG. 2, so that the thick portion 21 of the cassette is received in the recessed portions 8a and 8b, and the front open portion of the cassette 20 is received in the pocket 2. The cassette container case 1 can then be closed.

In the closed condition of the cassette container case 1, the spacing between a wall 10 of the casing 4 opposed to the face of the cassette and the wall 5 is slightly greater than the thickness $l_2$ of the cassette 20, except for the thick portion 21 of the cassette, and the spacing between the two recessed portions 8a and 8b is slightly greater than the thickness of the thick portion 21.

The cassette container case 1 may be made of conventionally used materials, and the material is not particularly limited. Also, the thickness of the walls of the cassette container case 1 may be of any thickness in so far as the case 1 can protect the cassette 20.

The thin-type cassette container case 11 can be formed with a thickness much smaller than that of the conventional case. The recessed portions 8a and 8b are provided in the pocket 2 of a channel-shaped cross-section having a high mechanical strength so that the overall mechanical strength of the cassette container case is not greatly reduced. Therefore, when the lid 3 is opened, the user's fingers will not contact the magnetic tape 24 exposed at the magnetic head insertion opening 23, thus preventing undesirable effects such as deposition of dust on the tape surface and stretching and other damage to the tape. Further, when the cassette is to be placed in the case, the lid 3, although thinned as a result of the provision of the recessed portions 8a and 8b, is not deformed, thereby preventing breakage due to flexing or cracking. The space required for storage of the cassette container case is reduced, and the cassette container case is very easy to carry.

As described above, in the cassette container case according to the present invention, the lid having the pocket for receiving the front open portion of the cassette and the casing having the rotation-preventing projections are pivotally connected for movement between open and closed positions. The recessed portions for receiving the thick portion of the cassette formed at the front open portion of the cassette are formed in the inner surface of the pocket. The recessed portions have a width in the direction of insertion of the cassette so as to enable the insertion and removal of the cassette.

The cassette container case can be formed with a thickness much smaller than that of the conventional case. The recessed portions are provided at the pocket of a channel-shaped cross section having a high mechanical strength, and therefore the overall mechanical strength of the cassette container case is not greatly reduced.

Thus, the invention provides a thin-type cassette container case which is easy to use, compact and sturdy.

What is claimed is:

1. A cassette container case comprising: a lid having a pocket for receiving a front open portion of a cassette, and a casing having rotation-preventing projections formed thereon, said lid and said casing being pivotally connected for movement between open and closed positions, a pair of recessed portions for receiving a thick portion of a cassette at said front open portion of said cassette, said recessed portions being formed in an inner surface of said pocket, said recessed portions having a width in a direction of insertion of said cassette enabling insertion and removal of said cassette, one of said recessed portions being formed in a rear wall of said lid and the other of said recessed portions being formed in a front wall of said lid defining said pocket, said other of said recessed portions extending the entire height of said front wall, the height of said recessed portion formed in said rear wall being slightly greater than the sum of the height of said front wall and the length of said thick portion of said cassette in the front-to-rear direction of said cassette.

2. The cassette container case of claim 1, wherein an edge of said other recessed portion directed toward the open side of said case is tapered or curved so as to facilitate the insertion and removal of said cassette.

* * * * *